C. D. McKNIGHT.
DEVICE FOR ATTACHING PLOWS TO VEHICLES.
APPLICATION FILED MAR. 22, 1918.

1,269,293. Patented June 11, 1918.

UNITED STATES PATENT OFFICE.

CLARENCE D. McKNIGHT, OF SAN FRANCISCO, CALIFORNIA.

DEVICE FOR ATTACHING PLOWS TO VEHICLES.

1,269,293.

Specification of Letters Patent.

Patented June 11, 1918.

Application filed March 22, 1918. Serial No. 223,940.

*To all whom it may concern:*

Be it known that I, CLARENCE D. MC-KNIGHT, a citizen of the United States, and a resident of San Francisco, in the county of San Francisco and State of California, have invented a new and useful Device for Attaching Plows to Vehicles, of which the following is a specification.

The object of my invention is to provide an attachment to enable the operation of a common walking plow successfully in connection with any farm motor driven vehicle.

Figure 1:
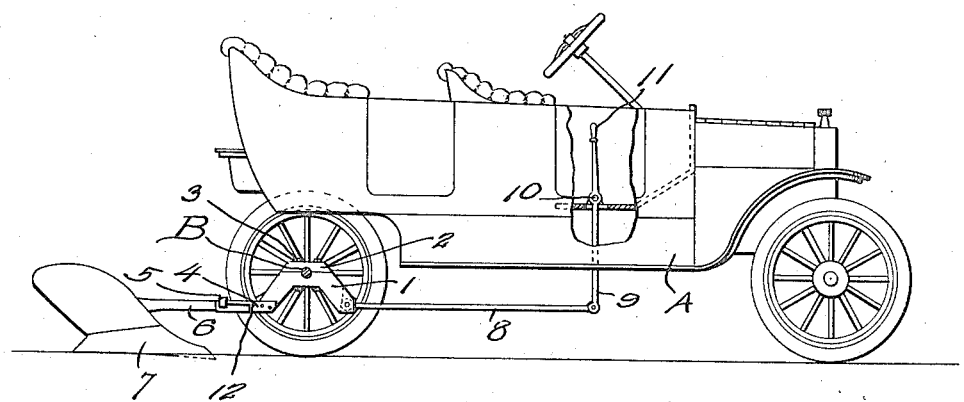
Figure 2:
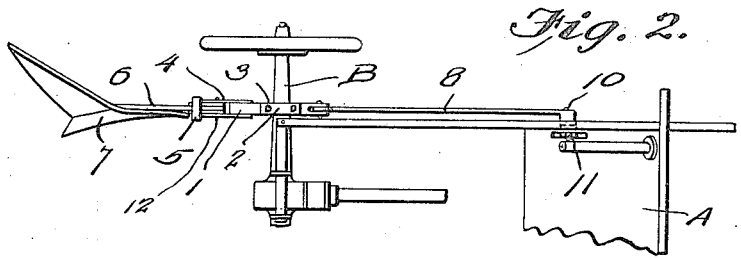
Figure 3:
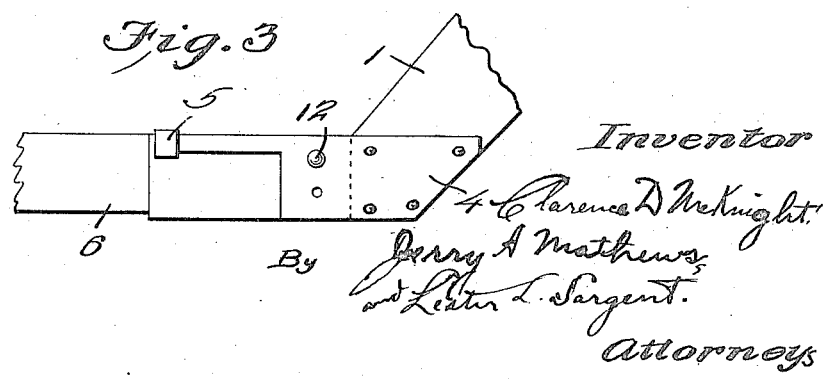

In the accompanying drawings, illustrating my invention, Figure 1 shows the device applied to an automobile, one wheel and a portion of the rear axle being removed from the automobile, to show the method of attaching the device; Fig. 2 is a top plan of the invention; and Fig. 3 is a detail of members 4, 5 and 6.

Like numerals designate like parts in the various views.

Referring to the accompanying drawings I provide a suitable plow 7 having a plow beam 6. I provide a clevis 4 which is secured to plow beam 6 by suitable fastening means such as bolt 12, for which there are preferably several openings. Clevis 4 is provided with an extended cap or band which engages over the top of the plow beam to hold the plow firmly in the ground. Clevis 4 is secured to the end of an axle clamp member of inverted U-shape designated by 1, and which is secured by suitable bolts 3 to an upper clamp member 2, by which the device is attached to the axle of an automobile, as shown in Fig. 1. Pivotally attached to the forward arm of lower clamp 1 is a rod 8, to the forward end of which is pivotally attached a suitable hand lever, which is pivotally mounted to the body of the automobile at 10. A suitable handle 11 is provided for lever 9.

In operation, lever 9 is operated to tilt the point of the plow up or down as required, the movement being transmitted through rod 8, clamps 1 and 2 (which are swingingly mounted on the axle) clevis 4 and its extension band or cap 5 to the plow beam 6.

What I claim is:

1. A device for attaching a plow to a vehicle, consisting of a clamp device pivotally mounted to the rear end of a vehicle on a plane out of line with other pivotal connections to the clamp, a clevis secured to one end of the clamp device and fastened to the plow beam, a rod pivotally attached to the other end of the clamp device, and an operating lever connected to said rod and pivotally mounted to the vehicle.

2. In a device for attaching a plow to a vehicle, the combination of a clamp member of inverted approximately U-shape, means for securing the said member loosely to the rear end of a vehicle, a second clamp member, means pivotally connecting the first mentioned clamp member to the front end of the beam of a plow, an operating lever extending into the vehicle body, and means connecting said lever to the forward end of the clamp member, substantially as shown.

CLARENCE D. McKNIGHT.

Copies of this patent may be obtained for five cents each, by addressing the "Commissioner of Patents, Washington, D. C."